Dec. 29, 1964  E. W. HAUGLAND  3,163,280
GRAIN AUGER BAG ATTACHMENT
Filed April 11, 1963
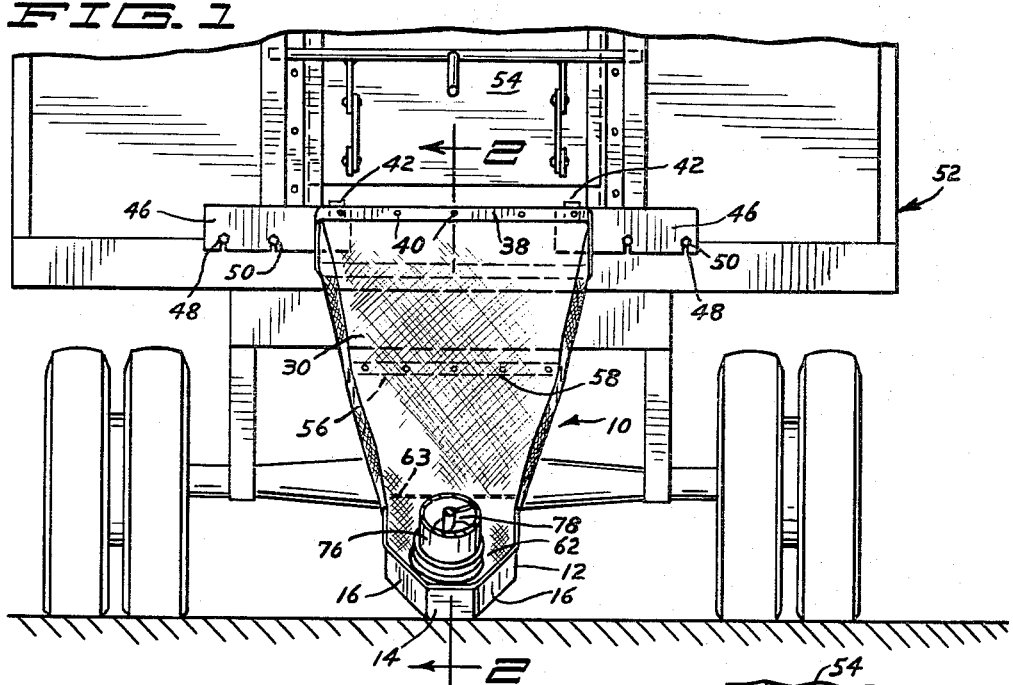
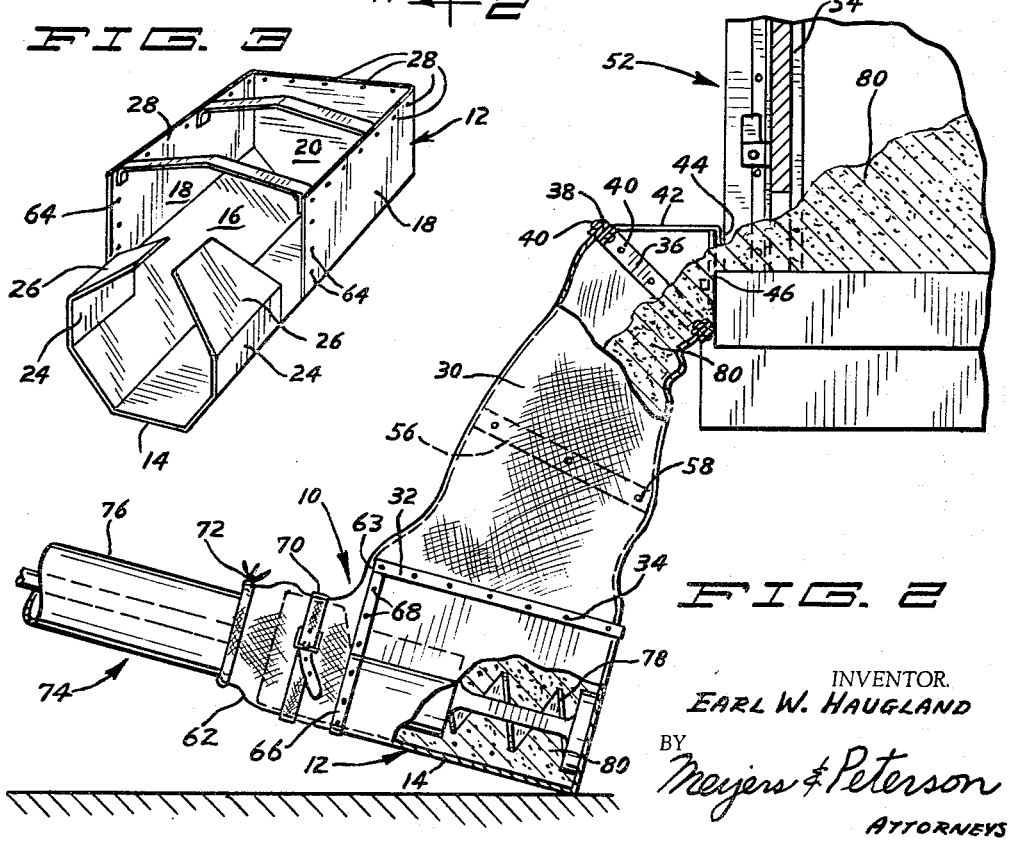
INVENTOR.
EARL W. HAUGLAND
BY
Meijers & Peterson
ATTORNEYS

3,163,280
GRAIN AUGER BAG ATTACHMENT
Earl W. Haugland, Hampden, N. Dak.
Filed Apr. 11, 1963, Ser. No. 272,454
8 Claims. (Cl. 198—1)

This invention relates generally to grain augers, and pertains more particularly to a bag-like attachment therefor.

One object of the invention is to provide a simple and low-cost device that can be readily attached at one end to a raised source of grain, such as the gate of a truck, and which will readily accommodate at its other end the lower end of a conventional grain auger that is used to elevate the grain to a hopper or bin.

Another object of the invention resides in the ease with which the device can be attached and detached to the truck or other source of grain that is to be transferred therefrom.

The invention has for a further object the provision of an attachment for grain augers that will prevent spillage and loss of grain during its use.

Still further, the invention has for an object to provide for the facile accommodation of grain augers of different designs and manufacture which may vary somewhat in shape and size.

Yet another object of the invention is to provide an attachment of the foregoing character that does not require precise alignment between the truck and the hopper or bin into which the grain is to be transferred.

The invention also has for an aim the provision of a grain auger bag attachment that will be sufficiently flexible so that the upper end of the grain auger can be moved or swung angularly so that the grain being discharged need not be deposited at only one point. In other words, it is possible with the instant invention to distribute the grain being discharged throughout a given area without interference or obstruction from the attachment.

Still another object of the invention is to provide an attachment for grain augers that will be both lightweight and compact so that it can be moved quite readily from place to place and also which will not occupy very much space when not being actually used.

These and other objects and advantages of my invention will more fully appear from the following description, made in connection with the accompanying drawing, wherein like reference characters refer to the same or similar parts throughout the several views and in which:

FIGURE 1 is a rear elevational view of a truck having my invention attached thereto so that grain contained in the truck can be transferred to a suitable bin or hopper;

FIGURE 2 is a sectional view taken generally in the direction of line 2—2 of FIGURE 1, and FIGURE 3 is a perspective view of the trough structure, the specific construction of which is not readily discernible from FIGURES 1 and 2.

Referring now in detail to the drawing, my bag attachment for grain augers has been denoted generally by the reference numeral 10. As best viewed in FIGURE 3, the attachment 10 inculdes a sheet metal trough 12 having a bottom section or wall 14, inclined sides 16, and vertical sides 18. The trough 12 also includes a back wall 20, thereby providing only an open upper end and an open forward end. A pair of straps 22 extend across the upper end, thereby imparting rigidity to the trough structure 12 by virtue of the fact that the vertical sides 18 are made more rigid at their upper edges.

Continuing with the description of the trough structure 12, it will be noted from FIGURE 3 that the forward portions of the inclined sides 16 are cut so as to form walls 24. These walls 24 have integral flaps 26 secured thereto, the material constituting the flaps 26 actually being original continuations of the vertical sides 18. For a purpose described below, the vertical sides 18, as well as the rear wall 20, are formed with a series of spaced holes 28 formed along their upper marginal edges.

From FIGURES 1 and 2, it can be seen that the attachment 10 includes a fabric inlet chute 30, such as canvas or duck material, although certain plastic materials can be utilized, and at the lower end of the canvas chute 30 is a U-shaped strip or band 32 that is utilized in securing or anchoring the chute 30 to the vertical sides 18 and the rear wall 20. Suitable screws or bolts 34 pass through the fabric constituting the chute 30 and are threadedly received in the holes 28, thus firmly anchoring the lower end of the chute 30 to the trough structure 12.

At the upper end of the fabric chute 30 is an inner rectangular strip or band 36 plus an outer rectangular strip or band 38. Here again, suitable screws or bolts 40 can pass through these strips or bands 36 and 38 so as to anchor the fabric constituing the chute 30 therebetween. Such screws or bolts 40 also serve in the illustrated instance to secure the ends of brackets or strips 42 to the bands 36, 38. The brackets or strips 42 have downturned free ends labeled 44. The downturned free ends 44 are intended to hook over or engage the upper edges of a pair of appropriately spaced plates 46. The plates 46 have a plurality of vertically disposed slots 48 in their lower marginal edges and these slots permit by virtue of a plurality of screws 50 the attaching of the device 10 to the rear end of a truck identified by the reference numeral 52. The truck 52 is equipped with a discharge gate 54 that is instrumental in allowing the contents of the truck to enter into the upper end of my attachment 10.

It is preferable that at least one additional rectangular strip or band 56 be suitably disposed within the fabric chute 30 at an intermediate location, here again suitable screws or bolts 58 passing through the fabric constituting the chute 30 anchoring the loop or band in place. In actual practice, two such bands 56 have been found highly desirable, as they assure an open passage through the chute 30 at all angles.

Attention is now directed to an outlet fabric sleeve, also of canvas or duck material, which has been denoted by the reference numeral 62. In the exemplary instance, the sleeve 62 is pictured as being stitched at 63 to the fabric chute 30. However, in order to anchor the remainder of the sleeve 62 to the trough structure 12, the bottom section 14, the inclined sides 16 and the vertical sides 18 are formed with additional holes 64. A U-shaped strip or band 66 is intended to overlie the outlet sleeve 62 and by means of screws 68 the sleeve is anchored to the trough 12 in an encircling relation with the integral wall portions 24 and the flaps 26 associated therewith.

The fabric sleeve 62 is equipped with a flexible belt or strap 70 that is intended to encircle the sleeve 62 and press the sleeve against the projecting portions of the trough 12 contained therein. At the free end of the fabric sleeve 62 is a draw cord 72. A grain auger has been generally designated by the reference numeral 74 and includes a cylindrical casing 76 having a screw 78 contained therein. The lower end of the grain auger 74 is accommodated by the trough 12, extending thereinto through the fabric sleeve 62. As can be readily understood, the function of the grain auger 74 is to transfer grain 80 from the truck 52 to a suitable hopper or bin (not shown).

Having presented the foregoing description, the manner in which my bag attachment for grain augers is used should be readily understood. Assuming that my attachment 10 is to be utilized in conjunction with a truck, which has been indicated by the reference numeral 52, the user of the device would first install the plates 46 at the proper locations with respect to the gate 54. This is readily accomplished through the agency of the screws 50, for once the screws 50 have been properly located then the plates 46 can be removed at any time when they are not needed, this being achieved merely by raising the plates 46, their slots 48 permitting this.

With the plates 46 properly installed, it will be discerned that the brackets 42 can be engaged therewith by placing the downturned ends 44 in back of the plates, as clearly shown in FIGURE 2. Actually, the brackets 42 might constitute a plate having a downturned marginal flange that would correspond to the downturned ends 44. A plate has the advantage of preventing any grain 80 from overflowing the entrance to the chute 30.

After performing the above acts, the lower end of the grain auger 74 can be inserted through the fabric sleeve 62 so that the exposed end of the screw 68 is adjacent the rear wall 20 of the trough structure 12. Having done this, the strap 70 can be tightened and also the draw string 72 can be tied so as to prevent any escape and spillage of the grain 80 as it is being augered into the cylindrical casing 76.

Inasmuch as grain augers of the depicted type are in general use, little needs to be said about the actual construction of such augers. These augers usually elevate the grain to a suitable discharge point, such as a hopper or bin, where the grain is stored until needed. However, it will be appreciated that there is no need for dumping any of the grain 80 on the ground or an intermediate receptacle as has been customary in the past. Instead, there is a direct route established between the source of grain, the truck 52 in the illustrated situation, and its point of destination, which has been identified as a bin or hopper even though it does not appear in the drawing. Consequently, the grain 80 flows gravitationally down through the fabric chute 30 and is then augered by the screws 78 into the casing 76 of the grain auger 74 without the necessity of manually shovelling any of the grain into juxtaposition with the lower end of the screw 78 as has been quite common heretofore.

It will, of course, be understood that various changes may be made in the form, details, arrangements and proportions of the parts without departing from the scope of my invention as set forth in the appended claims.

What is claimed is:

1. A bag attachment for grain augers comprising:
   (a) a trough structure having a bottom wall, upwardly directed side walls and an end wall,
   (b) said trough structure being open at the top and the other end thereof,
   (c) said bottom wall projecting beyond said side walls and thus beyond said open end;
   (d) resilient means integrally carried on the projecting portion of said bottom wall for receiving therebetween the lower portion of the casing of a grain auger,
   (e) said resilient means being capable of being flexed into engagement with said auger casing independently of said side walls, and
   (f) a fabric chute having its lower end attached to the upper end of said side and end walls and having its upper end adapted to be attached to a raised source of granular material.

2. A bag attachment for grain augers in accordance with claim 1 including:
   (a) a fabric sleeve underlying said protecting portion of said bottom wall and having one end attached to the open end of said trough structure for encircling the casing of said grain auger.

3. The bag attachment for grain augers in accordance with claim 2 in which said resilient means includes:
   (a) opposed resilient flaps.

4. A bag attachment for grain augers comprising:
   (a) a trough structure including bottom, side and rear walls thereby providing an open top and an open front,
   (b) said trough structure having a portion thereof projecting from said open end, said projecting portion having upwardly directed resilient elements thereon for embracing the lower end of the casing of a grain auger when extending into said trough structure via said open front;
   (c) a fabric sleeve encircling said projecting portion and resilient elements and secured at one end to said trough structure;
   (d) a fabric chute having one end secured to said trough structure at said open end, and
   (e) means at the other end of said chute for attaching said sleeve to a raised source of granular material.

5. A bag attachment for grain augers in accordance with claim 4 in which said last-mentioned means includes:
   (a) a pair of spaced bracket elements for engaging the upper edges of a pair of spaced plates mounted on the source of granular material.

6. A bag attachment for grain augers in accordance with claim 4 including:
   (a) a flexible strap encircling said fabric sleeve for pressing said sleeve against said projecting portion.

7. A bag attachment for grain augers in accordance with claim 6 including:
   (a) a draw string at the free end of said fabric sleeve for drawing said free end against the casing of the grain auger.

8. A bag attachment for grain augers comprising:
   (a) a trough structure including a bottom section, inclined sides, vertical sides, and a closed end,
   (b) said trough structure having said bottom section extending beyond said open end and having upwardly inclined portions, vertical portions and inwardly directed resilient flap portions for encircling the casing of the grain auger;
   (c) a fabric sleeve encircling said bottom extension, said inclined portions, said vertical portions and said flap portions,
   (d) said fabric sleeve being attached to said trough structure at its open end;
   (e) a fabric chute having its lower end secured to said trough structure at the upper edges of said side walls and said rear wall, and
   (f) bracket means at the other end of said chute for attaching said chute to a raised source of granular material.

References Cited by the Examiner

UNITED STATES PATENTS

| | | | |
|---|---|---|---|
| 386,153 | 7/88 | Moeller | 193—25 |
| 2,772,764 | 12/56 | McClellan | 193—25 |
| 3,035,682 | 5/62 | Ferch | 198—53 X |

SAMUEL F. COLEMAN, *Primary Examiner.*

WILLIAM B. LA BORDE, *Examiner.*